Feb. 4, 1941.　　H. HOLLMANN ET AL　　2,230,457
LINK CHAIN
Filed March 20, 1939
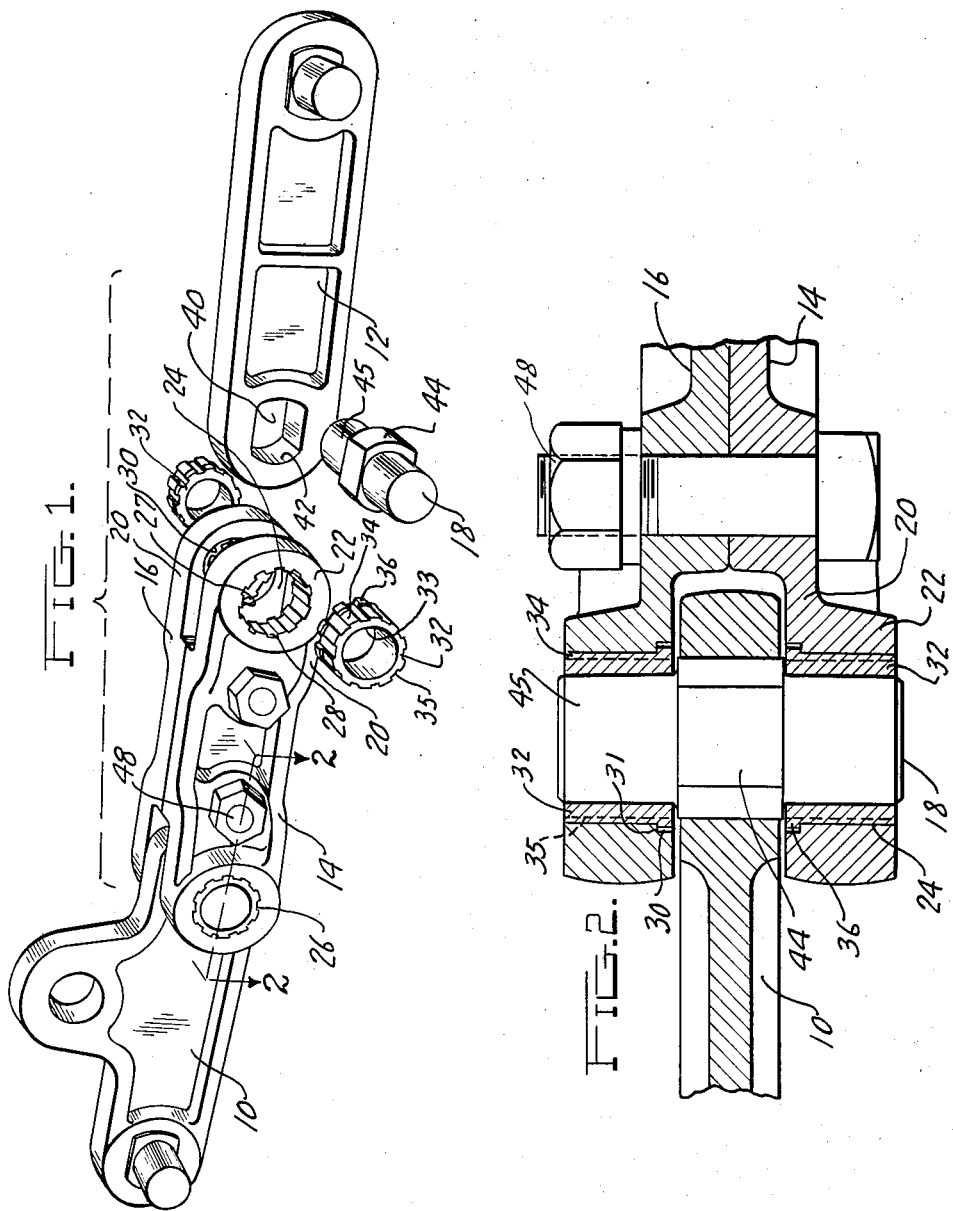
Inventors
Hubert Hollmann
William G. Van Voorhis
By Malcolm W. Fraser
Attorney Patented Feb. 4, 1941

2,230,457

UNITED STATES PATENT OFFICE 2,230,457

LINK CHAIN

Hubert Hollmann and William G. Van Voorhis, Findlay, Ohio, assignors to The Buckeye Traction Ditcher Company, Findlay, Ohio, a corporation of Ohio

REISSUED SEP 1942

Application March 20, 1939, Serial No. 263,087

1 Claim. (Cl. 74—254)

This invention relates to chains, and is particularly directed to a solid link chain structure, of a character adapted for use in excavating, and like machines.

An object of the present invention is to provide an improved pivotal connecting means between the adjacent links of a chain structure, the connecting means being replaceable as well as relatively adjustable to subject adjacently disposed surfaces therebetween to substantially uniform wear.

A further object of the invention is to provide a pivot pin and cooperating bushing arrangement that is readily inspectable in order to determine the amount of wear thereon, so that the wearing surfaces may be relatively altered or replaced when necessary.

A still further object of the invention is to provide a compact link chain structure wherein the pivot pin is fixed against rotation with respect to its supporting link, and the pivot pin bushing locating means are arranged to permit a multiplicity of step-by-step alterations between the wearing surfaces to compensate for wear therebetween.

Further objects and advantages of the invention will become apparent from a study of the following description when taken in connection with the accompanying drawing, in which:

Figure 1 is a perspective view of a form of the invention illustrating the pivotal connection between adjacent links of a chain and the means for altering the position of the wearing surfaces between the links; and Figure 2 is an enlarged fragmentary sectional detail view taken substantially on the line 2—2 of Figure 1.

Referring to the drawing and particularly to Figure 1 thereof, 10 illustrates an attachment link, 12 a center link, 14 and 16 a pair of cooperating parts of a connecting link for coupling the links 10 and 12 together through the medium of a pivot pin 18. In a chain of this character the several links are generally pivotally connected together to permit relative angular movement therebetween but prevent lateral movement, and thus provide a laterally rigid chain of links. However, relative angular pivotal movement between the links causes uneven wear on the pivotal connection because of the longitudinal pull on the chain, and also due to the fact that the links pivot over a comparatively small arc, as will be readily understood. As a result, most of the wear takes place between diametrically opposed portions of adjacent links and pins while the other surfaces remain in comparatively good condition.

Accordingly, by means of the present invention the pivotal connecting structure is arranged to enhance the life of the connecting link, and particularly of the cooperating pivot pin and bushings. The connecting link parts 14 and 16 are formed at each extremity with offset end portions 20 and enlarged bosses 22. Each boss 22 is provided with an aperture 24 interiorly splined as at 26 to provide a multiplicity of alternate inwardly extending elongate radial ribs 27 and elongate grooves 28. The inner end of each of the apertures 24 is recessed as at 30 to provide an annular shoulder or stop 31 against which abuts outwardly extending lugs formed on the inner end of each bushing 32, thereby to limit the axial movement of the bushings within their respective apertures.

Each bushing 32 is generally of annular form provided with a cylindrical bore 33 and a splined exterior surface to present a plurality of alternate ribs and grooves 34 and 35 respectively, and corresponding in number and size to the ribs and grooves provided in the wall of the aperture 24. A lug 36 is formed on the inner end of each of the ribs 27 for the purpose above described. From the description thus far, it will be noted that bushings 32 are receivable in the apertures 24 in a number of different relative positions and that cooperating means are provided on the links and bushings to prevent lateral displacement of the bushings in one direction.

The links 10 and 12 are provided adjacent their extremities with apertures 40 of generally rectangular form having arcuate end surfaces 42. The apertures 40 are thus arranged to receive enlarged intermediate portions 44 of pins 18, portions 44 being of a form similar to that of the apertures 40. On opposite sides of the enlarged portions 44 are cylindrical bearing surfaces 45 fitting the bores 33 of the bushings 32 so that the bushings and pins can rock relative to each other.

When the parts 14 and 16 of the connecting link are assembled, the laterally offset portions 20 provide a yoke at each end, between each pair of legs of which is received the end portion of an adjacent link element. The parts 14 and 16 of the connecting link are separably secured together by means of a pair of nut and bolt assemblies 48. Thus the bushings 32 may be inserted in the apertures 24 from the inside and the links 14 and 16 subsequently assembled with the links 10 and 12, so that the cylindrical bearing surfaces of the pin 18 are received within the bushings 32.

As particularly noted in Figure 2, the offset portions 28 of the link parts 14 and 16 provide a space somewhat wider than the thickness of the end of the link 10. Such an arrangement provides clearance between adjacent links which militates against constant frictional engagement therebetween for the purpose of reducing wear to a minimum. It will be noted also that during use, the wear on the bushings occurs on diametrically opposed surfaces longitudinally of the links, and when such portions become worn sufficiently, the structure may be readily disassembled and the bushings removed and turned slightly with respect to the aperture to present new unworn bearing portions to the pins 18. Likewise the pins 18 may be turned through an arc of 180° to present relatively unworn bearing surfaces, as will be readily understood.

Thus it is possible to make use of the same bushings for a long period of time since the splined connection enables slight turning adjustment to present new bearing surfaces to the pins in those regions subjected to greatest wear. The lugs 36 on the inner end of each bushing not only limit the axial movement thereof but also form a surface against which the adjacent pin part may abut, thus providing a satisfactory bearing surface between two surfaces treated to resist wear.

Although the invention has been described in connection with chain structures of a particular type, it is to be understood that the arrangement of the cooperating pivotal bearing surfaces may be utilized in other structures, and that the invention is not to be limited to the particular arrangement chosen for illustration, except as defined in the appended claim.

What we claim is:

A chain comprising a link having laterally spaced separable end parts formed with aligned apertures, each aperture having an annular series of alternating ribs and grooves communicating with a counterbore of enlarged diameter, an internal shoulder at the junction of each aperture and its respective counterbore, a bushing having corresponding ribs and grooves fitting each aperture, radial lugs formed at the inner ends of the ribs of each said bushing and engageable with the shoulder formed by said counterbore to limit outward movement of said bushing, a second link extending between said end parts having an opening aligned with said apertures, a pin having an enlarged central portion fitting said opening and non-rotatably received therein, said enlarged central portion having sides against which the inner ends of said bushings bear to prevent inward movement thereof and to constitute a bearing surface therefor, whereby said bushings are retained in the counterbored portions of the first said link and are prevented from shifting laterally.

HUBERT HOLLMANN.
WILLIAM G. VAN VOORHIS.